United States Patent
Zhou

(10) Patent No.: US 12,406,033 B2
(45) Date of Patent: Sep. 2, 2025

(54) DATA PROCESSING METHOD AND APPARATUS, CHIP SYSTEM, AND MEDIUM

(71) Applicant: Shenzhen Yinwang Intelligent Technologies Co., Ltd., Shenzhen (CN)

(72) Inventor: Zheng Zhou, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 181 days.

(21) Appl. No.: 17/706,351

(22) Filed: Mar. 28, 2022

(65) Prior Publication Data

US 2022/0215197 A1    Jul. 7, 2022

Related U.S. Application Data

(63) Continuation of application No. PCT/CN2020/109187, filed on Aug. 14, 2020.

(30) Foreign Application Priority Data

Sep. 29, 2019  (CN) .......................... 201910934078.3

(51) Int. Cl.
  G06F 18/25    (2023.01)
  B60W 60/00    (2020.01)
  G05B 13/02    (2006.01)

(52) U.S. Cl.
  CPC .......... G06F 18/251 (2023.01); B60W 60/001 (2020.02); G05B 13/0265 (2013.01);
  (Continued)

(58) Field of Classification Search
  CPC .......................... G06F 18/251; G06F 2218/00; B60W 60/001; B60W 2556/35; B60W 2556/45;
  (Continued)

(56) References Cited

U.S. PATENT DOCUMENTS 9,563,199 B1* 2/2017 Ferguson ............... B60W 40/04
2003/0186663 A1* 10/2003 Chen ........................ G06T 5/40
(Continued)

FOREIGN PATENT DOCUMENTS

CN    102303605 A    1/2012
CN    105682222 A    6/2016
(Continued)

OTHER PUBLICATIONS

Hu et al., "Research on Information Fusion Algorithm for Vehicle Speed information and Road Adhesion Property Estimation," Proceedings of the 2009 IEEE, International Conference on Mechatronics and Automation, Changchun, China, Total 6 pages, Institute of Electrical and Electronics Engineers, New York, New York (Aug. 9-12, 2009).

(Continued)

*Primary Examiner* — Ramon A. Mercado
*Assistant Examiner* — Ellis B. Ramirez
(74) *Attorney, Agent, or Firm* — Leydig, Voit & Mayer, Ltd.

(57) ABSTRACT

A data processing method, apparatus, chip system, and medium are provided. The method may be applied to the field of autonomous driving or intelligent driving. The method includes: obtaining first abstract data from first raw data by using a first recognition algorithm, where the first abstract data includes attribute description data of a first target; receiving first feedback data, where the first feedback data includes attribute description data of a second target; and optimizing the first recognition algorithm based on the first feedback data, where the first raw data is measurement data of a scenario, and the first target and the second target are targets in the scenario.

15 Claims, 6 Drawing Sheets

(52) U.S. Cl.
CPC ..... *B60W 2556/35* (2020.02); *B60W 2556/45* (2020.02); *G06F 2218/00* (2023.01)

(58) Field of Classification Search
CPC ............. G05B 13/0265; G05D 1/0088; G05D 1/0246; G05D 1/0257; G05D 2201/0212
USPC ............................ 701/24, 301; 180/167, 169
See application file for complete search history.

(56) References Cited

U.S. PATENT DOCUMENTS

| | | | |
|---|---|---|---|
| 2004/0068496 A1* | 4/2004 | Bergman | H04L 69/329 |
| 2005/0021201 A1* | 1/2005 | Klotz | B60W 30/16 |
| 2006/0204107 A1 | 9/2006 | Dugan et al. | |
| 2010/0007476 A1* | 1/2010 | Klotz | G06V 20/58 |
| 2013/0090803 A1* | 4/2013 | Stahlin | G08G 1/163 |
| 2013/0158852 A1 | 6/2013 | Stahlin et al. | |
| 2013/0328763 A1* | 12/2013 | Latta | G06F 3/017 |
| 2014/0195138 A1* | 7/2014 | Stelzig | G08G 1/0116 |
| 2017/0124781 A1* | 5/2017 | Douillard | G08G 1/207 |
| 2018/0349782 A1* | 12/2018 | Zheng | G06N 20/00 |
| 2018/0349784 A1 | 12/2018 | Zheng et al. | |
| 2019/0138004 A1* | 5/2019 | Palanisamy | G06N 5/045 |
| 2019/0156485 A1* | 5/2019 | Pfeiffer | G05D 1/0253 |
| 2019/0228571 A1 | 7/2019 | Atsmon | |
| 2021/0109526 A1* | 4/2021 | Ohl | G07C 5/08 |
| 2022/0092870 A1* | 3/2022 | Himmelsbach | G06V 20/58 |

FOREIGN PATENT DOCUMENTS

| | | |
|---|---|---|
| CN | 107908655 A | 4/2018 |
| CN | 108196535 A | 6/2018 |
| CN | 108229366 A | 6/2018 |
| CN | 108732589 A | 11/2018 |
| CN | 109816033 A | 5/2019 |
| CN | 109901574 A | 6/2019 |
| CN | 110160804 A | 8/2019 |
| CN | 110263324 A | 9/2019 |

OTHER PUBLICATIONS

Xiaomin, "Research on Object Tracking Algorithm Based on Multi-sensor Data Fusion," Jilin University, Total 63 pages (Jun. 2015). With an English Abstract.

Henriques et al., "High-Speed Tracking with Kernelized Correlation Filters," IEEE Transactions on Pattern Analysis and Machine Intelligence, arXiv:1404.7584v3 [cs.CV], Total 14 pages, Institute of Electrical and Electronics Engineers, New York, New York (Nov. 5, 2014).

Liu et al., Real-time part-based visual tracking via adaptive correlation filters, Total 11 pages, Institute of Electrical and Electronics Engineers, New York, New York (2015).

* cited by examiner

DATA PROCESSING METHOD AND APPARATUS, CHIP SYSTEM, AND MEDIUM

CROSS-REFERENCE TO RELATED APPLICATIONS

This application is a continuation of International Application No. PCT/CN2020/109187, filed on Aug. 14, 2020, which claims priority to Chinese Patent Application No. 201910934078.3, filed on Sep. 29, 2019. The disclosures of the aforementioned applications are hereby incorporated by reference in their entireties.

TECHNICAL FIELD

This application relates to the field of autonomous driving technologies, and in particular, to a data processing method. In addition, this application further relates to a data processing apparatus, a chip system, and a computer-readable storage medium.

BACKGROUND

As driving of vehicles are increasingly autonomous, an amount of data generated by the vehicles becomes larger. Intel estimates that an autonomous vehicle equipped with sensors such as a Global Positioning System (GPS) sensor, a sonar, a camera, a millimeter-wave radar, and a Light Detection and Ranging (LiDAR) may generate more than 4000 GB of data every day. A computing architecture for data processing is needed to process such a massive amount of data.

FIG. 1 is a schematic diagram of a typical data processing architecture of an autonomous vehicle. A processing unit of the autonomous vehicle is responsible for processing data, and may include three modules: a data fusion module, a planning and decision-making module, and a behavior control module. After a sensor (for example, a camera, a LiDAR, or a sonar) captures an electrical signal in a traffic scenario, the sensor digitizes the electrical signal to convert the electrical signal into digital signal data, that is, raw data. Then, the sensor processes the raw data by using a recognition algorithm to obtain abstract data. The abstract data generally includes a traffic target recognized from the traffic scenario and attribute description data of the traffic target, for example, a color and a size of a vehicle, or indication content of a traffic sign. Each of sensors sends its abstract data to the data fusion module in the processing unit. The data fusion module fuses the abstract data. The data fusion module re-recognizes the traffic target and the attribute description data of the traffic target by integrating the abstract data of the sensors, to obtain fused data. Attribute description data of the traffic target included in the fused data may be the same as or different from the attribute description data of the traffic target recognized by each sensor. Through data fusion, accuracy of recognizing the traffic target and an attribute of the traffic target can be improved to some extent. The fused data can be used to build a world model (also referred to as an environmental model) in a computer to simulate what happens in the real world. The planning and decision-making module plans and makes decisions on a driving route of the vehicle based on the world model. Finally, the behavior control module indicates, based on the decisions, actuators (for example, a throttle, a brake, a steering wheel, windows, and lights) to perform operations, so as to control a travel trajectory of the vehicle.

It can be seen from the foregoing data processing process that accuracy of the abstract data provided by the sensors directly affects accuracy of planning and decision-making of a subsequent driving route. Generally, after the sensor processes, by using the recognition algorithm, the raw data obtained from the traffic scenario and obtains the abstract data, the sensor does not know whether the abstract data is consistent with the real situation. If the abstract data is inconsistent with the real situation, each time the sensor obtains the same raw data, the sensor obtains, through processing, the same abstract data inconsistent with the real situation. As a result, recognition accuracy of the sensor is difficult to improve.

SUMMARY

This application provides a data processing method. A sensor using the method can perform bidirectional data transmission with a processing unit, and optimize a recognition algorithm based on feedback data fed back by the processing unit, to improve recognition accuracy of the sensor.

According to a first aspect, this application provides a data processing method. The method includes: obtaining first abstract data from first raw data by using a first recognition algorithm, where the first abstract data includes attribute description data of a first target; receiving first feedback data, where the first feedback data includes attribute description data of a second target; and optimizing the first recognition algorithm based on the first feedback data, where the first raw data is measurement data of a scenario, and the first target and the second target are targets in the scenario.

In this implementation, a first sensor not only sends, to the outside, information recognized from a traffic scenario, that is, the first abstract data, but also can receive the first feedback data from the outside. This implements bidirectional transmission. The first sensor may further optimize the first recognition algorithm based on the attribute description data of the second target in the same traffic scenario, so as to improve accuracy of obtaining the first abstract data from the first raw data by using the first recognition algorithm, that is, to improve recognition accuracy of the first sensor.

With reference to the first aspect, in a first possible implementation of the first aspect, the second target includes at least one first specific target, and a target that is the same as the first specific target exists in the first target. The first specific target is a target that is also recognized by the first sensor. In this implementation, the first sensor optimizes the first recognition algorithm by using attribute description data that is of the first specific target and that is determined in another way, to improve recognition accuracy of the first sensor.

With reference to the first aspect and the foregoing possible implementation, in a second possible implementation of the first aspect, the second target includes at least one second specific target, and a target that is the same as the second specific target does not exist in the first target. The second specific target is a target that is not recognized by the first sensor. In this implementation, the first sensor optimizes the first recognition algorithm by using attribute description data that is of the second specific target and that is determined in another way, to improve recognition accuracy of the first sensor.

With reference to the first aspect and the foregoing possible implementations, in a third possible implementation of the first aspect, the first feedback data includes location information and the attribute description data of the second specific target; and the step of optimizing the first recognition algorithm based on the first feedback data includes: optimizing the first recognition algorithm based on the location information and the attribute description data of the at least one second specific target. For the second specific target, because the target is not recognized by the first sensor, the second specific target is associated with a feature point at a corresponding location in the first raw data by using the location information. In this manner, the first sensor can optimize the first recognition algorithm by using the attribute description data of the second specific target. This improves recognition accuracy of the first sensor.

With reference to the first aspect and the foregoing possible implementations, in a fourth possible implementation of the first aspect, the attribute description data of the second target is data determined based on the first abstract data, or data determined based on interaction information from a cloud sensor. The attribute description data of the second target determined based on the first abstract data or based on the interaction information from the cloud sensor is closer to an actual situation of the target in the scenario. Feeding back such data to the first sensor helps the first sensor optimize the first recognition algorithm, and improve recognition accuracy.

With reference to the first aspect and the foregoing possible implementations, in a fifth possible implementation of the first aspect, the first raw data, the first abstract data, and the first feedback data include a timestamp. The timestamp is used to indicate information about a time point of obtaining the first raw data from the scenario. The step of optimizing the first recognition algorithm based on the first feedback data includes: optimizing the first recognition algorithm based on the first raw data, the first abstract data, and the first feedback data that correspond to the timestamp. Based on the timestamp, the first sensor can find the first raw data, the first abstract data, and the first feedback data that correspond to the timestamp, so as to avoid a situation in which recognition accuracy of the first sensor is affected due to confusion of first raw information, first abstract data, first feedback data that correspond to different time points.

With reference to the first aspect and the foregoing possible implementations, in a sixth possible implementation of the first aspect, the step of optimizing the first recognition algorithm based on the first feedback data includes: optimizing the first recognition algorithm based on the attribute description data of the second target and a confidence corresponding to the attribute description data of the second target, where the confidence is used to represent a trustworthiness degree of the attribute description data of the second target. In this implementation, the first sensor may adjust a calibration amplitude of a parameter of the first recognition algorithm based on different confidences of the second attribute description data, to further improve recognition accuracy of the first sensor after optimization.

With reference to the first aspect and the foregoing possible implementations, in a seventh possible implementation of the first aspect, the attribute description data of the second target includes a source tag, and the source tag is used to identify a source of the attribute description data of the second target; and there is a correspondence between the source of the attribute description data of the second target and the confidence of the attribute description data of the second target. In this implementation, the first sensor may determine the corresponding confidence based on the source tag of the attribute description data of the second target, to adjust the calibration amplitude of the parameter of the first recognition algorithm, and further improve recognition accuracy of the first sensor after optimization.

According to a second aspect, this application provides a data processing method. The method includes: receiving first abstract data from a first sensor, where the first abstract data comes from first raw data, and the first abstract data includes attribute description data of a first target; determining first feedback data, where the first feedback data includes attribute description data of a second target; and sending the first feedback data to the first sensor. The first raw data is measurement data of a scenario, and the first target and the second target are targets in the scenario.

In this implementation, a processing unit may not only receive information recognized by the first sensor from a traffic scenario, that is, the first abstract data, but also send the first feedback data determined by the processing unit to the first sensor, to implement bidirectional transmission. In this way, the first sensor can optimize, based on the first feedback data, a recognition algorithm used by the first sensor, and improve recognition accuracy of the first sensor.

With reference to the second aspect, in a first possible implementation of the second aspect, the method further includes: determining at least one first specific target based on the first abstract data or based on interaction information from a cloud sensor. A target that is the same as the first specific target exists in the first target. The first feedback data includes attribute description data of the at least one first specific target. In this implementation, the processing unit may determine, based on the first abstract data or based on the interaction information from the cloud sensor, the first specific target that can also be recognized by the first sensor, so as to feed back the attribute description data that is of the first specific target that is determined in another way to the first sensor. In this manner, the first sensor can optimize a first recognition algorithm by using the attribute description data of the first specific target. This improves recognition accuracy of the first sensor.

With reference to the second aspect and the foregoing possible implementation, in a second possible implementation of the second aspect, the method further includes: determining at least one second specific target based on second abstract data or based on the interaction information from the cloud sensor. The second abstract data comes from second raw data, the second raw data is measurement data of the scenario, the second abstract data includes attribute description data of a third target, the third target is a target in the scenario, a target that is the same as the second specific target does not exist in the first target, and the first feedback data includes attribute description data of the at least one second specific target. In this implementation, the processing unit may determine, based on the second abstract data or based on the interaction information from the cloud sensor, the second specific target that the first sensor does not recognize, so as to feed back the attribute description data that is of the second specific target that is determined in another way to the first sensor. In this manner, the first sensor can optimize the first recognition algorithm by using the attribute description data of the second specific target. This improves recognition accuracy of the first sensor.

With reference to the second aspect and the foregoing possible implementations, in a third possible implementation of the second aspect, the first feedback data further includes location information of the at least one second specific target. For the second specific target, because the first sensor does not recognize the target, the processing unit may also feed back the location information of the second specific target to the first sensor. In this manner, the first sensor can associate the second specific target with a feature point at a corresponding location in the first raw data based on the location information, and optimize the first recognition algorithm by using the attribute description data of the second specific target. This improves recognition accuracy of the first sensor.

With reference to the second aspect and the foregoing possible implementations, in a fourth possible implementation of the second aspect, the step of determining first feedback data includes: determining the attribute description data of the second target based on the first abstract data or based on the interaction information from the cloud sensor. In this implementation, the processing unit can determine the attribute description data of the second target based on the first abstract data or based on the interaction information from the cloud sensor, so as to feed back the attribute description data of the second target determined in these ways to the first sensor. In this manner, the first sensor can optimize the first recognition algorithm by using the attribute description data of the second target fed back by the processing unit. This improves recognition accuracy of the first sensor.

With reference to the second aspect and the foregoing possible implementations, in a fifth possible implementation of the second aspect, the first raw data, the first abstract data, and the first feedback data include a timestamp. The timestamp is used to indicate information about a time point of obtaining the first raw data from the scenario through measurement. The step of sending the first feedback data to the first sensor includes: sending the first feedback data corresponding to the timestamp of the first raw data and the first abstract data to the first sensor. In this implementation, the processing unit sends the first feedback data corresponding to the timestamp to the first sensor, so that the first sensor can find the first raw data, the first abstract data, and the first feedback data that correspond to the timestamp, so as to avoid a situation in which recognition accuracy of the first sensor is affected due to confusion of first raw information, first abstract data, first feedback data that correspond to different time points.

With reference to the second aspect and the foregoing possible implementations, in a sixth possible implementation of the second aspect, the first feedback data includes a confidence corresponding to each piece of attribute description data of the second target. The confidence is used to represent a trustworthiness degree of the piece of attribute description data of the second target. In this implementation, the first feedback data includes confidences corresponding to pieces of attribute description data of the second target, so that the first sensor may adjust a calibration amplitude of a parameter of the first recognition algorithm based on a difference in confidences of the second attribute description data, to further improve recognition accuracy of the first sensor after optimization.

With reference to the second aspect and the foregoing possible implementations, in a seventh possible implementation of the second aspect, each piece of attribute description data of the second target includes a corresponding source tag, and the source tag is used to identify a source of the piece of attribute description data of the second target; and there is a correspondence between the source of the piece of attribute description data of the second target and the confidence of the piece of attribute description data of the second target. In this implementation, each piece of attribute description data of the second target includes a corresponding source tag, so that the first sensor may determine the corresponding confidence based on the source tag of the piece of attribute description data of the second target, and further adjust the calibration amplitude of the parameter of the first recognition algorithm, to further improve recognition accuracy of the first sensor after optimization.

According to a third aspect, this application provides a data processing apparatus. The apparatus includes: a first transceiver module, configured to receive first feedback data, where the first feedback data includes attribute description data of a second target; and at least one first processing module, configured to: obtain first abstract data from first raw data by using a first recognition algorithm, and optimize the first recognition algorithm based on the first feedback data, where the first abstract data includes attribute description data of a first target, the first raw data is measurement data of a scenario, and the first target and the second target are targets in the scenario.

According to a fourth aspect, this application provides a data processing apparatus. The apparatus includes: a second transceiver module, configured to receive first abstract data from a first sensor, and send first feedback data to the first sensor, where the first abstract data comes from first raw data, the first abstract data includes attribute description data of a first target, the first feedback data includes attribute description data of a second target, the first raw data is measurement data of a scenario, and the first target and the second target are targets recognized from the scenario; and at least one second processing module, configured to determine the first feedback data.

According to a fifth aspect, this application provides a chip system. The system includes at least one processor and an interface, where the interface is configured to receive code instructions and transmit the code instructions to the at least one processor, and the at least one processor runs the code instructions to implement any method according to the first aspect.

According to a sixth aspect, this application provides a chip system. The system includes at least one processor and an interface, where the interface is configured to receive code instructions and transmit the code instructions to the at least one processor, and the at least one processor runs the code instructions to implement any method according to the second aspect.

According to a seventh aspect, this application provides a computer-readable storage medium, configured to store a computer program or instructions. When the computer program or the instruction runs on an electronic device, the electronic device is enabled to implement any method according to the first aspect.

According to an eighth aspect, this application provides a computer-readable storage medium, configured to store a computer program or instructions. When the computer program or the instruction runs on an electronic device, the electronic device is enabled to implement any method according to the second aspect.

BRIEF DESCRIPTION OF DRAWINGS

To describe technical solutions of this application more clearly, the following briefly describes accompanying drawings in embodiments.

DESCRIPTION OF EMBODIMENTS

Figure 1:
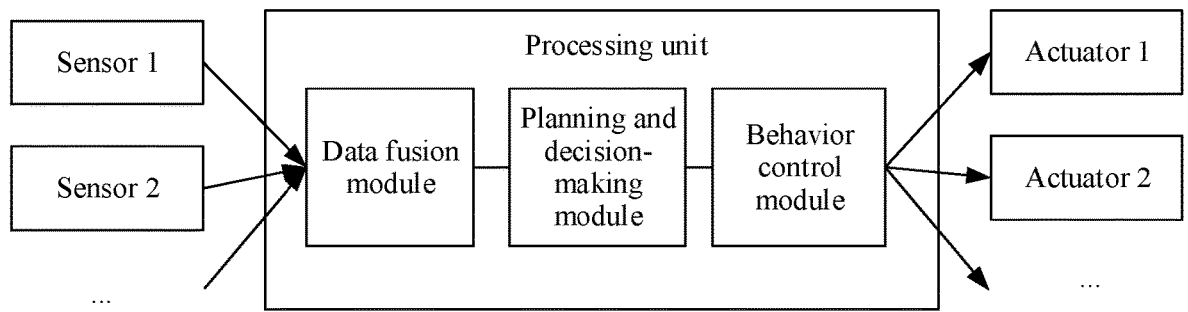
FIG. 1 is a schematic diagram of a typical data processing architecture of an autonomous vehicle.

Generally, a sensor used in fields of autonomous driving, smart driving, and the like sends data to a processing unit unidirectionally, as shown in FIG. 1. As a result, the sensor cannot optimize its own recognition algorithm, and further, it is difficult to improve recognition accuracy of the sensor.

Usually, a vehicle is equipped with a plurality of sensors, including internal and external sensors. The internal sensors are sensors configured to measure some status data of the vehicle, such as a gyroscope, an accelerometer, a steering angle sensor, a wiper activity sensor, and a steering indicator. These internal sensors may be installed on the interior or exterior of the vehicle. The external sensors are sensors configured to measure environmental data around the vehicle, such as a radar, a LiDAR, an ultrasonic radar, a camera, a global positioning system sensor, and a sonar. These external sensors may be installed on the exterior or interior of the vehicle. In addition, sensors may also be installed at another location like the roadside, such as a microwave radar, a millimeter-wave radar, and a camera, and these sensors are mainly configured to measure a status of a target on a road.

In addition to the sensors installed on the vehicle or at the roadside, a cloud sensor may further be used in the fields of autonomous driving, smart driving, and the like. The cloud sensor may also be referred to as a metadata sensor. The vehicle may establish a communication connection with the cloud sensor for interaction, so as to obtain information about a traffic target in a traffic scenario from the cloud sensor. The cloud sensor herein may be a cloud server, or another terminal, a base station, or the like that is connected to the vehicle by using a vehicle to everything (V2X) technology. For example, the vehicle may establish a communication connection with a cloud server, and obtain, from a high-definition map of the cloud server, information about a transportation infrastructure near the current location of the vehicle, and the like. For another example, the vehicle may establish a communication connection with another vehicle in a traffic scenario, and then obtain information such as a size, a color, and a speed of the another vehicle.

Figure 2:
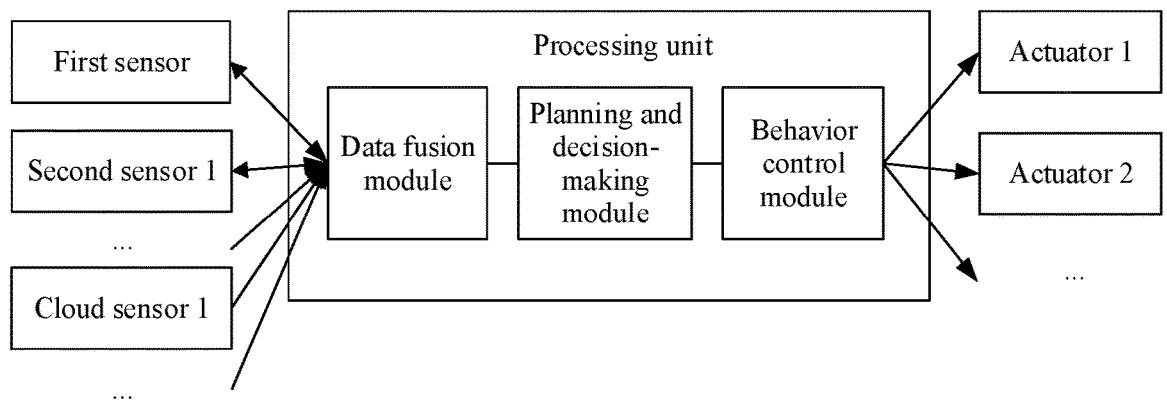
FIG. 2 is a schematic diagram of an architecture of a data processing system of a vehicle according to an embodiment of this application.

A sensor that performs the data processing method in embodiments of this application may be the foregoing sensor installed on the vehicle or at the roadside. For ease of differentiation, in embodiments of this application, any sensor that performs the data processing method in this application is referred to as a first sensor. A sensor other than the first sensor is referred to as a second sensor. FIG. 2 is a schematic diagram of an architecture of a data processing system of a vehicle according to an embodiment of this application. The system includes one first sensor, one or more second sensors, and one or more cloud sensors. These sensors are connected to a processing unit, and the processing unit is also connected to a plurality of actuators.

A first embodiment of this application provides a data processing method. The method is performed by the first sensor. Optionally, the method may be performed by an electronic control unit (ECU) in the first sensor. According to the data processing method in this embodiment, the first sensor may perform bidirectional transmission with the processing unit, receive feedback data that is fed back, and optimize, by using the feedback data, a recognition algorithm used by the sensor, to avoid repeated occurrence of a same recognition error and improve recognition accuracy of the sensor.

Figure 3:
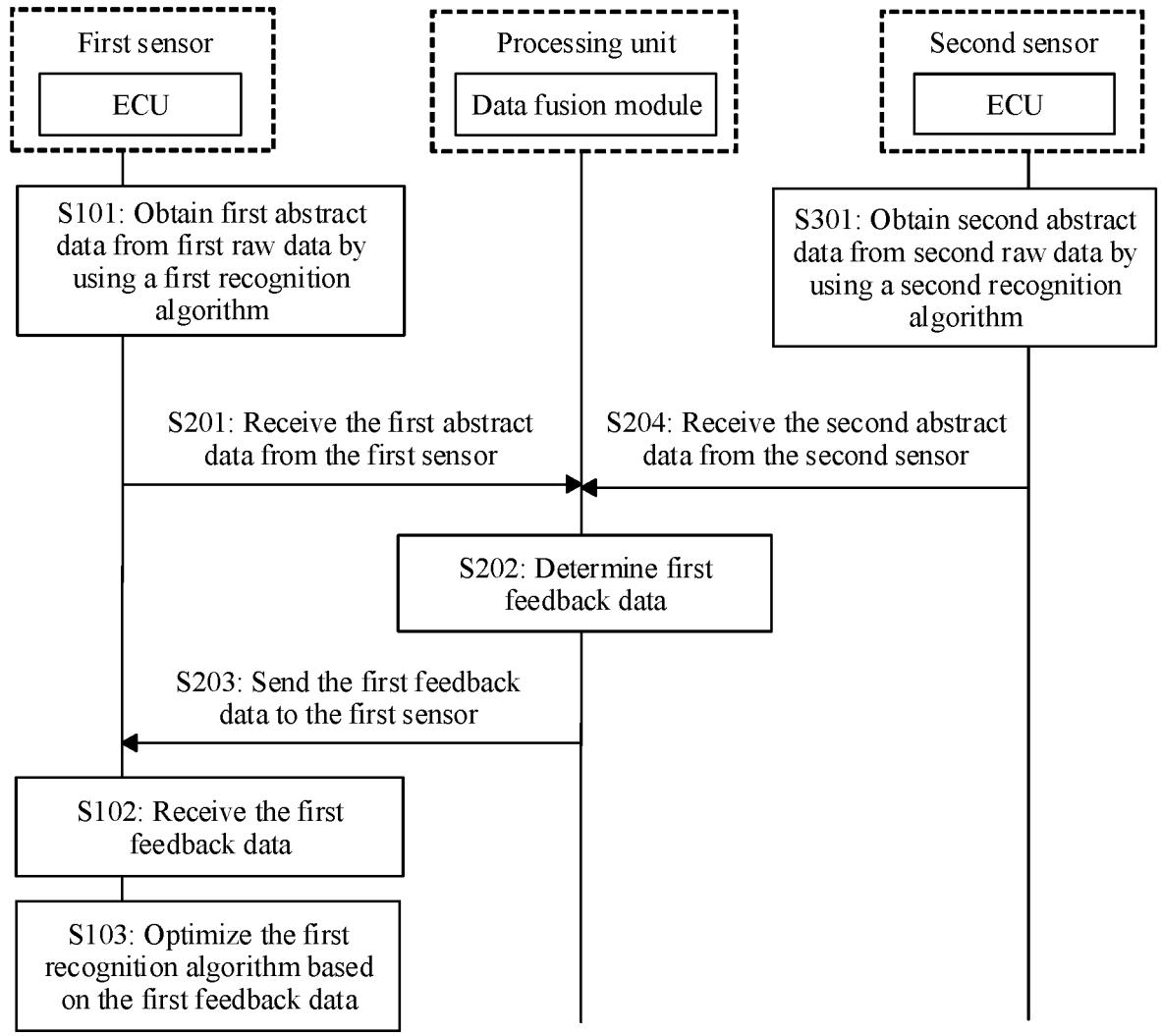
FIG. 3 is a flowchart of an implementation 1 of a data processing method according to this application.

FIG. 3 is a flowchart of an implementation 1 of a data processing method according to this application. Steps performed by the first sensor include the following S101 to S103.

S101: The first sensor obtains first abstract data from first raw data by using a first recognition algorithm.

In this embodiment of this application, a scenario mainly refers to a traffic scenario. The scenario may include a traffic participant or a traffic environment in the traffic scenario, for example, another vehicle or a traffic sign on a road, and may also include information that is not directly associated with autonomous driving and smart driving, for example, green belts along the road.

Raw data is measurement data of the scenario, and is used to digitally describe the traffic scenario. The sensor may capture an electrical signal from the traffic scenario, and then digitize the electrical signal to obtain raw data. A specific method for obtaining the raw data through capture and processing may be an existing method. Details are not described herein again. The method for obtaining the raw data is not limited in this application.

For ease of differentiating raw data in different sensors, in embodiments of this application, data obtained by the first sensor from the traffic scenario through measurement is referred to as the first raw data. Specific data forms of the first raw data may be different for different specific sensor forms of the first sensor.

For example, when the first sensor is a camera, the camera converts optical signals captured from the traffic scenario into electrical signals. Then, these electrical signals are digitized to convert the electrical signals into data that can describe a picture of the traffic scenario, that is, the first raw data.

For another example, when the first sensor is a LiDAR, the LiDAR emits lasers to scan the traffic scenario. Persons and objects in the traffic scenario reflect the lasers back. Both intensity of light reflected by different persons and objects and time of reflection are different. Based on this, the LiDAR can obtain information in the traffic scenario. To be specific, the LiDAR receives the reflected light, and converts optical signals into electrical signals. Then, these electrical signals are digitized to obtain data that can describe the persons and objects in the traffic scenario, namely, point cloud information of the LiDAR, that is, the first raw data in embodiments of this application.

A target in this application mainly refers to a traffic target, and may be a traffic participant or a traffic environment. The traffic participant includes a dynamic person or object, for example, a vehicle, a pedestrian, or an animal on the road. The traffic environment includes a static object, for example, a traffic sign (including lane lines, a traffic light, a traffic sign plate, or the like) or a guardrail.

A recognition algorithm in this application may be an existing recognition algorithm, for example, a feature recognition algorithm or a target recognition algorithm. More specifically, the recognition algorithm may be a Kalman filtering tracking algorithm or the like.

When processing the raw data by using the recognition algorithm, the sensor can recognize the traffic target and attribute description data of the traffic target from the traffic scenario. When traffic targets are different categories of traffic participants or traffic environments, attribute description data of the traffic targets is also different. For example, when the traffic target is a vehicle running on the road, the attribute description data of the traffic target may be a size of the vehicle, a distance between the vehicle and another vehicle, a surface material, a direction angle, a speed, or an acceleration. For another example, when the traffic target is a traffic sign, the attribute description data of the traffic target may be content or a location of the traffic sign.

Different sensors may use different recognition algorithms or a same recognition algorithm for processing raw data. This is not limited in this application. For ease of differentiation, in this application, a recognition algorithm used by the first sensor is referred to as the first recognition algorithm, a traffic target recognized by the first sensor from the traffic scenario by using the first recognition algorithm is referred to as a first target, and abstract data obtained by the first sensor from the first raw data by using the first recognition algorithm is referred to as the first abstract data. The first abstract data includes attribute description data of the first target, for example, a category, a size, a distance between the first target and another vehicle, a surface material, a direction angle, a speed, an acceleration, content, or a location of the first target.

It should be noted that the first sensor may recognize one or more first targets, and each first target may correspond to one or more pieces of attribute description data. In this case, the first abstract data may include all the attribute description data corresponding to each first target. The first sensor may alternatively not recognize any traffic target. In this case, the attribute description data of the first target in the first abstract data is empty.

For example, the first sensor is a camera, and the camera recognizes a plurality of first targets, including traffic targets whose target IDs are T001 and T002. Attributes corresponding to T001 include a type, a size, a color, and the like. Attributes corresponding to T002 include a type, content, and the like. The first abstract data includes attribute description data of the plurality of first targets, and some attribute description data of two first targets is shown in Table 1.

the same as or different from the first target. Similar to the attribute description data of the first target, the attribute description data of the second target may be a category, a size, a distance between the second target and the first target, a surface material, a direction angle, a speed, an acceleration, content, a location, or the like of the second target.

The processing unit may determine, in a plurality of manners, the attribute description data of the second target included in the first feedback data. The attribute description data of the second target is data determined based on the first abstract data, or data determined based on interaction information from a cloud sensor. For example, in an implementation, the processing unit may fuse abstract data from a plurality of sensors to obtain fused data, and then determine the attribute description data of the second target based on the fused data. For another example, in another implementation, the processing unit may interact with the cloud sensor, receive the interaction information from the cloud sensor, and then determine the attribute description data of the second target based on the interaction information. The attribute description data that is of the second target and that is determined based on the fused data or the interaction information is closer to an actual situation of the traffic target in the traffic scenario. Feeding back such data to the first sensor helps the first sensor optimize the first recognition algorithm, and improve recognition accuracy.

Optionally, before determining the first feedback data, the processing unit may first determine the second target. Specifically, the processing unit may determine the second target in a plurality of manners. For example, in an implementation, the processing unit may fuse the abstract data from the plurality of sensors to obtain the fused data, and then determine the second target based on the fused data. For another example, in another implementation, the processing unit may determine the second target based on the interaction information from the cloud sensor.

It should be noted that the foregoing plurality of different manners of determining the second target may be combined with a plurality of different manners of determining the attribute description information of the second target. Several implementations of determining the second target and determining the attribute description data of the second target are further described below with reference to examples.

As described above, usually, a plurality of sensors including the first sensor and at least one second sensor are installed on the vehicle or at the roadside. The first sensor

TABLE 1

Example of attribute description data of a first target

| | | Target ID Attribute of the target | T001 | | | T002 | |
|---|---|---|---|---|---|---|---|
| | | | Type | Size | Color | Type | Content |
| First sensor | Camera | First abstract data | Vehicle | 4546 × 1681 × 1250 | Black | Traffic sign | No large buses |

S102: The first sensor receives first feedback data.

The first sensor sends the first abstract data to the processing unit, and then receives the first feedback data sent by the processing unit, where the first feedback data includes attribute description data of a second target. The second target herein refers to a traffic target recognized from the foregoing same traffic scenario, and the second target may be and the second sensor each obtain raw data from the traffic scenario through measurement, and process the raw data by using respective corresponding recognition algorithms to obtain respective corresponding abstract data.

In this embodiment of this application, data obtained by the second sensor from the traffic scenario through measurement is referred to as second raw data. Each second sensor processes, by using a second recognition algorithm corresponding to the second sensor, second raw data obtained by the second sensor through measurement, to obtain corresponding second abstract data. In other words, for any second sensor, steps performed by the second sensor may include step S301.

S301: The second sensor obtains the second abstract data from the second raw data by using the second recognition algorithm.

A process of obtaining the second abstract data is also a process in which each second sensor recognizes a traffic target from the traffic scenario. The traffic target recognized by the second sensor in the traffic scenario is referred to as a third target in embodiments of this application. The second abstract data includes attribute description data of the third target. The second raw data is similar to the first raw data, the second recognition algorithm is similar to the first recognition algorithm, and the second abstract data is similar to the first abstract data. For details, refer to the foregoing related descriptions. Details are not described herein again. Each second sensor sends its own second abstract data to the processing unit.

For example, one of the second sensors, namely, a second sensor 1 is a LiDAR. The LiDAR recognizes a total of three third targets with target IDs T001, T002, and T003. Attributes corresponding to T001 include a type, a size, a color, and the like. Attributes corresponding to T002 include a type, content, and the like. Attributes corresponding to T003 include a type, a size, and the like. Another second sensor, namely, a second sensor 2 is a millimeter-wave radar, and the millimeter-wave radar also recognizes the three same third targets T001, T002, T003 recognized by the first sensor 1. Second abstract data 1 corresponding to the second sensor 1 includes attribute description data of the three third targets, and second abstract data 2 corresponding to the second sensor 2 also includes the attribute description data of the three third targets, as shown in Table 2.

are good for recognizing a traffic target at a long distance, and some are good for recognizing a traffic target in bad weather. A traffic target recognized by a single sensor may not be accurate or reliable, and there may be a traffic target that the single sensor misses.

In view of this, in an implementation, the processing unit may fuse the abstract data received from the plurality of sensors to obtain the fused data. In terms of the fused data, recognition statuses of the plurality of sensors are comprehensively considered, and a traffic target is re-determined, to reduce a probability of missing a traffic target. The re-determined traffic target may be used as the second target in embodiments of this application. In this application, an existing data fusion method may be used for data fusion. Details are not described herein again. A data fusion manner is not limited in this application.

After determining the second target, the processing unit may obtain the attribute description data of the second target from the fused data, or may communicate with the cloud sensor to obtain the attribute description data of the second target. Then, the processing unit sends the first feedback data to the first sensor, where the first feedback data includes the attribute description data of the second target.

For example, after receiving the abstract data separately sent by the plurality of sensors such as the camera, the LiDAR, and the millimeter-wave radar shown in Table 1 and Table 2, the processing unit performs data fusion on the data to obtain fused data. The fused data includes the attribute description data corresponding to the three second targets, and the attribute description data of each second target is shown in Table 3. The processing unit sends the first feedback data to the first sensor, where the first feedback

TABLE 2

Example of attribute description data of a third target

| | | Target ID Attribute of | T001 | | | T002 | | T003 | | |
|---|---|---|---|---|---|---|---|---|---|---|
| | | the target | Type | Size | Color | Type | Content | Type | Size | Color |
| Second sensor 1 | Lidar | Second abstract data 1 | Vehicle | 4641 × 1770 × 1467 | — | Traffic sign | — | Vehicle | 4790 × 1735 × 1644 | Dark green |
| Second sensor 2 | Millimeter-wave radar | Second abstract data 2 | Vehicle | 4637 × 1767 × 1455 | — | Traffic sign | — | Vehicle | 4784 × 1708 × 1634 | Dark green |
| ... | ... | ... | ... | ... | ... | ... | ... | ... | ... | ... |

Different sensors have different characteristics. Some are good for recognizing a traffic target at a short distance, some data includes a part or all of the attribute description data of the three second targets: T001, T002, and T003.

TABLE 3

Example of attribute description data of a second target included in fused data

| | Target ID Attribute of | T001 | | | T002 | | T003 | | |
|---|---|---|---|---|---|---|---|---|---|
| | the target | Type | Size | Color | Type | Content | Type | Size | Color |
| Processing unit | Fused data | Vehicle | 4605 × 1720 × 1430 | Black | Traffic sign | No large buses | Vehicle | 4780 × 1720 × 1630 | Dark green |

Figure 4:
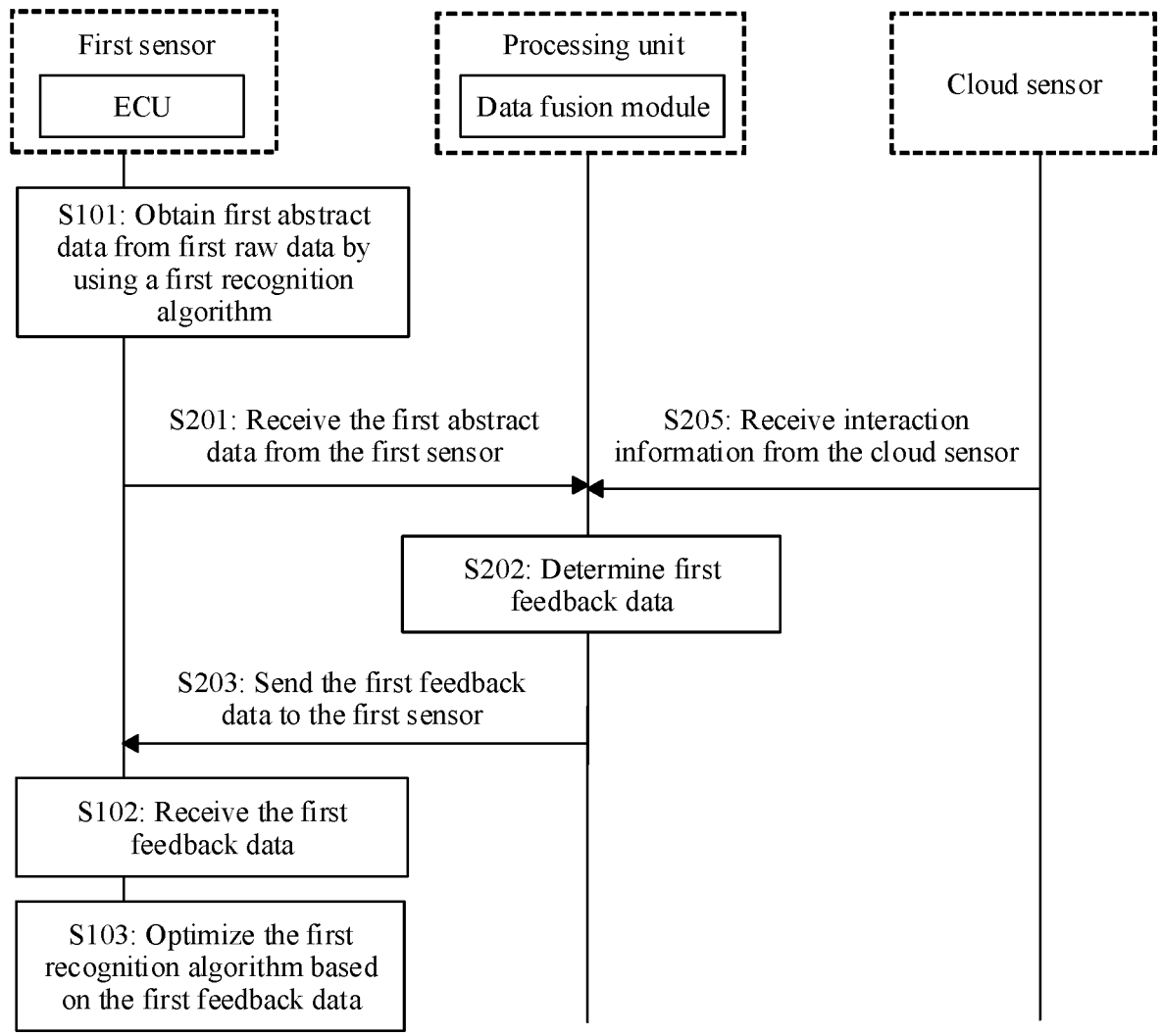
FIG. 4 is a flowchart of an implementation 2 of a data processing method according to this application.

FIG. 4 is a flowchart of an implementation 2 of a data processing method according to this application. In another implementation, the processing unit may further establish a communication connection with the cloud sensor, and receive the interaction information from the cloud sensor. The interaction information may include attribute description data that is of a traffic target in the traffic scenario and that is stored on the cloud sensor, for example, attribute description data of a vehicle or a traffic sign in the traffic scenario. The processing unit may determine the second target based on the interaction information.

For example, the cloud sensor may be a cloud server, and the cloud server stores a high-definition map. Generally, the high-definition map in embodiments of this application is an electronic map with higher definition and more data dimensions than a common navigation map. That the definition is higher means that the definition can reach a centimeter level, and that there are more data dimensions means that surrounding traffic-related static information in addition to road information is included. The high-definition map stores a large amount of driving auxiliary information as structured data, and the structured data mainly includes two types. The first type is road data, for example, lane information such as a location, a type, a width, a slope, and a curvature of a lane line. The second type is information about static traffic targets around a lane, for example, information about one or more of a traffic sign, a traffic light, a sewer inlet, an obstacle, an elevated object, and a guardrail. If the processing unit obtains, from the cloud server, attribute description data of an obstacle near a current location of the vehicle, as shown in Table 4, the obstacle may be determined as the second target, and a target ID is T004.

For another example, the cloud sensor may be a vehicle B in the traffic scenario. The vehicle A in which the processing unit is located may establish a communication connection with the vehicle B, and receive information sent by the vehicle B. The vehicle B may preset some attribute description data that is of the vehicle B and that is allowed to be sent to another terminal, for example, a size or a color of the vehicle B, or a direction angle, a speed, or an acceleration of the vehicle B at a current time point. After the vehicle A establishes the communication connection with the vehicle B, the vehicle B may send the information to the vehicle A. Therefore, the processing unit may receive the attribute description data of the vehicle B, as shown by attribute description data corresponding to T001 in Table 4. Accordingly, the processing unit may determine the vehicle B as one second target, and a target ID is T001.

TABLE 4

Example of interaction information obtained from a cloud sensor

| | Target ID Attribute of | T004 | | T001 | | |
|---|---|---|---|---|---|---|
| | a target | Type | Size | Type | Size | Color |
| Processing unit | Information received from the cloud sensor | Obstacle | 490 × 200 × 50 | Vehicle | 4605 × 1720 × 1430 | Dark gray |

After determining the second target, the processing unit may determine the attribute description data of the second target based on the interaction information from the cloud sensor. In addition, when the fused data includes the attribute description data of the second target, the processing unit may also obtain the attribute description data of the second target from the fused data. Then, the processing unit sends the first feedback data to the first sensor, where the first feedback data includes the attribute description data of the second target. For example, in the foregoing example, the processing unit determines the first feedback data based on the interaction information shown in Table 4, where the first feedback data may include a part or all of the attribute description data of the two second targets T001 and T004.

It should be noted that a part or all of the second targets determined in the foregoing two manners may be the same. In an implementation, it may be determined, based on locations of the traffic targets in the traffic scenario, whether the traffic targets determined in the two methods are the same. If the traffic targets are the same, a same target ID may be used for identification, for example, the traffic target whose ID is T001 in Table 3 and Table 4. If the traffic targets are not the same, different target IDs are used for differentiation, for example, T002 and T003 in Table 3, and T004 in Table 4.

The processing unit may select, based on different application scenarios or according to different preset rules, the attribute description data of the second target determined in one manner, or combine the attribute description data of the second target determined in the two manners, and then send the first feedback data including the attribute description data of the second target to the first sensor.

Figure 5:
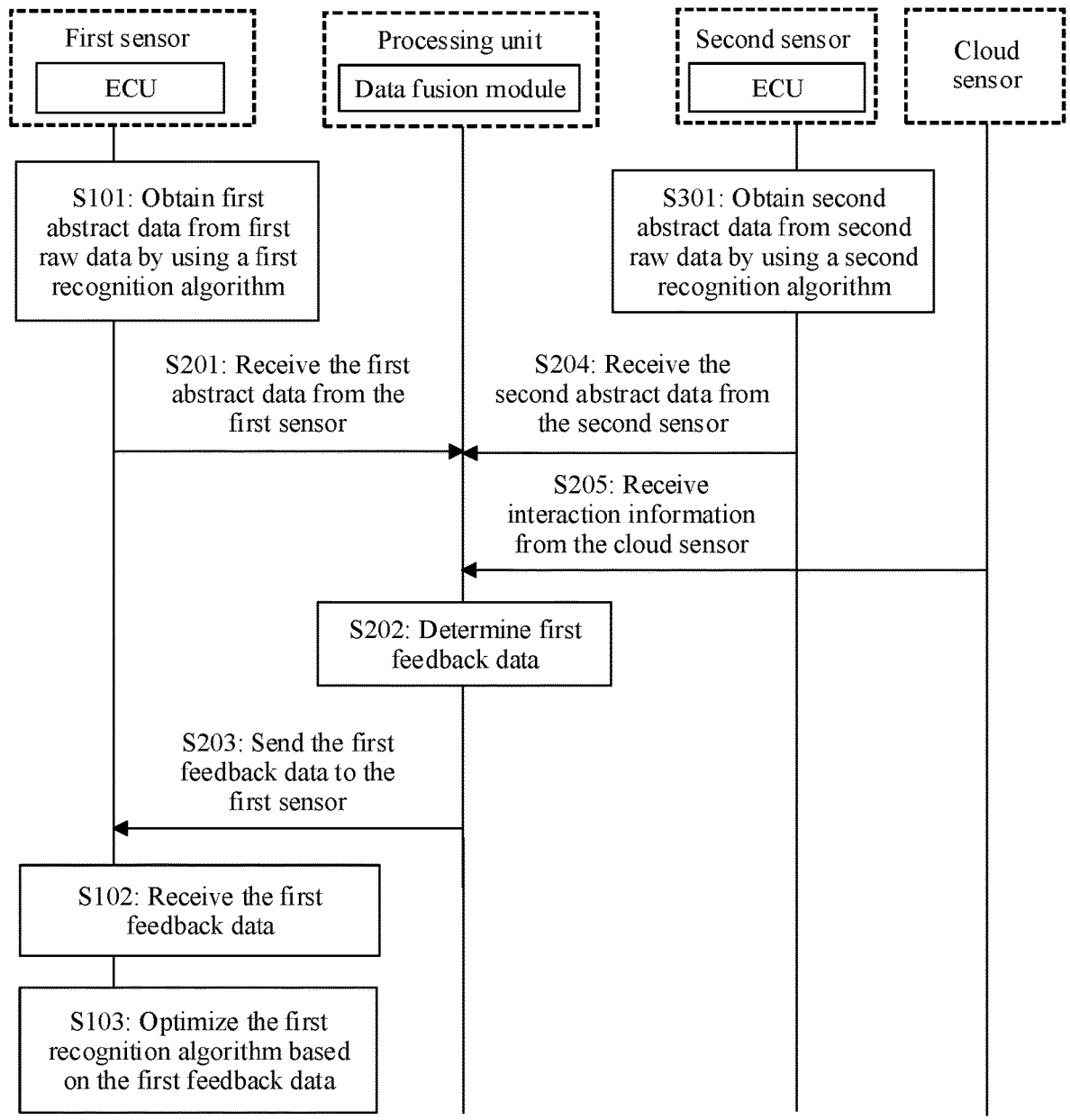
FIG. 5 is a flowchart of an implementation 3 of a data processing method according to this application.

FIG. 5 is a flowchart of an implementation 3 of a data processing method according to this application. The processing unit not only receives the second abstract data from the second sensor, but also receives the interaction information from the cloud sensor. After the first abstract data and the second abstract data are fused to obtain fused data, the processing unit combines attribute description data of the second target in the fused data and attribute description data of the second target in the interaction information, to determine the first feedback data that needs to be sent to the first sensor.

For example, in the foregoing example in Table 3, T001 and T002 determined by the processing unit after data fusion are the same as the first target recognized by the first sensor, and T003 is a traffic target not recognized by the first sensor. In an implementation, the first feedback data may include the attribute description data of the three second targets in Table 3, so that the first recognition algorithm is optimized by using the attribute description data and recognition accuracy of the first sensor is improved.

For another example, in the foregoing example in Table 4, T001 determined by the processing unit based on the interaction information is the same as the first target recognized by the first sensor, and T004 is a traffic target not recognized by the first sensor. In an implementation, the first feedback data may include the attribute description data of the two second targets in Table 4, so that the first recognition algorithm is subsequently optimized by using the attribute description data and recognition accuracy of the first sensor is improved.

For another example, in another implementation, the processing unit may further determine the first feedback data according to a preset rule, so that the first feedback data includes the attribute description data of T002 and T003 in Table 3, and the attribute description data of T001 and T004 in Table 4.

It should be further noted that, for one same second target, attribute description data of the second target determined in the foregoing two manners may be different. In this case, when determining the first feedback data, the processing unit may select, based on different application scenarios or according to different preset rules, the attribute description data of the second target determined in one manner, or combine the attribute description data of the second target determined in the two manners.

For example, both Table 3 and Table 4 include the attribute description data of T001. In an implementation, when determining the first feedback data, the processing unit may preferentially use the attribute description data sent by T001. In another implementation, the processing unit may combine the attribute description data determined in the two manners, and use the data such as the type and color of T001 in Table 4 and the data such as the size of T001 in Table 3.

There may be one or more second targets involved in the first feedback data. It can be learned from the foregoing two manners of determining the second target that the second targets may include a target recognized by the first sensor, and may include a target that should be recognized by the first sensor but is not recognized by the first sensor. For ease of description, in embodiments of this application, traffic targets that are in the second targets and that are the same as the first target, namely, the traffic targets recognized by the first sensor, are referred to as first specific targets. A part of traffic targets that are in the second targets and that are different from the first target, namely, the traffic targets that are not recognized by the first sensor, are referred to as second specific targets.

The first feedback data may include attribute description data of at least one first specific target. The first specific target may be a traffic target determined by the processing unit based on the fused data obtained by fusing the first abstract data and the second abstract data. The first specific target may alternatively be a traffic target determined by the processing unit based on the interaction information obtained from the cloud sensor.

The first feedback data may include attribute description data of at least one second specific target. The second specific target may be a traffic target determined by the processing unit based on the fused data obtained by fusing the second abstract data and the first abstract data. In other words, the second specific target may be a target that is not recognized by the first sensor but recognized by the second sensor. The second specific target may alternatively be a traffic target determined by the processing unit based on the interaction information obtained from the cloud sensor.

For the second abstract data, the data fusion, the interaction information, the second raw data related to the second abstract data, the third target, the attribute description data of the third target, and the like herein, refer to the foregoing related descriptions. Details are not described herein again.

For one first specific target, because the first sensor also recognizes the target (the target is one of the first targets), the first specific target may be associated, by using an ID number and the like, with the one of the first targets recognized by the first sensor. For a second specific target, because the first sensor does not recognize the target, the second specific target needs to be associated with a feature point at a corresponding location in the first raw data by using location information, for subsequent optimization. In other words, when the first feedback data includes attribute description data of one or more second specific targets, the first feedback data further includes location information of the one or more second specific targets. The location information herein may be a pixel location, a coordinate location, a location relative to the vehicle, or the like. In this manner, the first sensor may associate the second specific target with the feature point at the corresponding location in the first raw data, so that the first sensor optimizes the first recognition algorithm by using the attribute description data of the second specific target.

S103: The first sensor optimizes the first recognition algorithm based on the first feedback data.

When the attribute description data of the second target is different from the attribute description data of the first target, it indicates that a result obtained by processing the first raw data by the first sensor by using the first recognition algorithm is inconsistent with an actual situation.

Specifically, if a second target is a first specific target, that is, the first sensor also recognizes the same traffic target, attribute description data of the traffic target in the first abstract data and attribute description data of the traffic target in the first feedback data may be compared to determine whether the attribute description data of the traffic target in the first abstract data and the attribute description data of the traffic target in the first feedback data are the same. If the attribute description data of the traffic target in the first abstract data and the attribute description data of the traffic target in the first feedback data are the same, it indicates that the attribute description data of the traffic target recognized by the first sensor is accurate, and optimization is not needed. If the attribute description data of the traffic target in the first abstract data and the attribute description data of the traffic target in the first feedback data are different, it may be considered that the attribute description data of the second target is different from the attribute description data of the first target. If the second target is a second specific target, that is, the first sensor does not recognize the same traffic target, attribute description data of the second target is necessarily different from attribute description data of all the first targets in the first abstract data. In other words, the attribute description data of the second target is different from the attribute description data of the first target.

In an implementation, regardless of whether the attribute description data of the second target is the same as the attribute description data of the first target, the processing unit may send the first feedback data including the attribute description data of the second target to the first sensor, and the first sensor determines whether the attribute description data of the second target and the attribute description data of the first target are the same.

In another implementation, because the processing unit can receive the attribute description data of the first target recognized by the first sensor, the processing unit may determine whether the attribute description data of the second target and the attribute description data of the first target are the same. If the attribute description data of the second target and the attribute description data of the first target are different, the first feedback data including the attribute description data of the second target is sent to the first sensor.

When the attribute description data of the second target is different from the attribute description data of the first target, data that can reflect an actual situation, that is, the attribute description data of the second target, can be used to optimize the first recognition algorithm. Optimization in embodiments of this application may be optimization of some modifiable parameters in the first recognition algorithm, or may be in another optimization manner. This is not limited in this application.

Optimization of a parameter in the first recognition algorithm may also be understood as calibration of a parameter in the first recognition algorithm. Generally, a function of one specific recognition algorithm is invariable, and a parameter is adjustable. When the recognition algorithm is applied to different application scenarios, the recognition algorithm needs to be trained by using a specific training sample first. Training means adjusting some parameters in the recognition algorithm, so that the recognition algorithm obtains a better prediction effect in a specific application scenario. After the training is complete, a use stage of the recognition algorithm can be entered. These parameters are usually invariable during the use stage. However, in the technical solutions in embodiments of this application, in the use stage, the foregoing first feedback data is also used to re-calibrate these parameters in the recognition algorithm, to further improve the prediction effect.

A specific parameter calibration method may be an existing method. For example, in an implementation, values of the parameters in the first recognition algorithm may be updated based on a difference between the attribute description data of the first specific target and the attribute description data of the same traffic target in the first abstract data. For another example, in another implementation, values of the parameters in the first recognition algorithm may be updated based on the attribute description data of the second specific target and the first raw data.

It should be noted that, when first recognition algorithms are different algorithms, to-be-calibrated parameters are correspondingly different. For ease of further understanding of a parameter calibration process, the following is briefly described by using a Kalman filtering tracking algorithm as an example.

The Kalman filtering tracking algorithm is an optimal linear state estimation method. To be specific, the Kalman filtering tracking algorithm is an algorithm that performs optimal estimation on a system state by inputting and outputting observation data through a system by using a linear system state equation. Because the observation data includes effects of noise and interference in the system, an optimal estimation process may also be considered as a filtering process. The Kalman filtering tracking algorithm is often used in fields of communication, radar, navigation, and the like. Five formulas are needed to implement the Kalman filtering tracking algorithm, where prediction equations include the following two formulas: (1) and (2), and update equations include the following three formulas: (3), (4), and (5), which are specifically as follows:

$$\hat{x}_{\bar{k}} = A\hat{x}_{k-1} + Bu_{k-1}; \quad (1)$$

$$P_{\bar{k}} = AP_{k-1}A^T + Q; \quad (2)$$

$$K_k = \frac{P_{\bar{k}}H^T}{HP_{\bar{k}}H^T + R}; \quad (3)$$

$$\hat{x}_k = \hat{x}_{\bar{k}} + K_k(z_k - H\hat{x}_{\bar{k}}); \text{ and} \quad (4)$$

$$P_k = (I - K_kH)P_{\bar{k}}. \quad (5)$$

$\hat{x}_{\bar{k}}$ indicates a priori state estimation value at a moment k, and the priori state estimation value at the moment k is an intermediate calculation result during filtering.

$\hat{x}_{k-1}$ indicates a posteriori state estimation value at a moment k−1, $\hat{x}_k$ indicates a posteriori state estimation value at the moment k, and each is a filtering result.

A indicates a state transition matrix, and the state transition matrix is an n×n matrix. A is a conjecture model for transition of a target state.

$u_{k-1}$ indicates a control gain at the moment k−1. In common application scenarios, this parameter may be set to 0.

B indicates a gain of an optional control input u, and is an n×1 matrix. In most practical situations, there is no control gain, and in this case, B is 0.

$P_{\bar{k}}$ indicates a priori estimation covariance at the moment k, and the priori estimation covariance at the moment k is an intermediate result during filtering.

$P_{k-1}$ indicates a posteriori estimation covariance at the moment k−1, $P_k$ indicates a posteriori estimation covariance at the moment k, and each is a filtering result.

Q indicates a process excitation noise covariance, and this parameter is used to indicate an error between the state transition matrix and an actual process.

$K_k$ indicates a Kalman gain, and the Kalman gain is an intermediate calculation result during filtering.

H indicates a measurement matrix, and the measurement matrix is an m×n matrix. The matrix converts a measured value from m dimensions to n dimensions to enable the measured value to conform to a mathematical form of a state variable, and is one of the prerequisites for filtering.

R indicates a measurement noise covariance.

$z_k$ indicates a measured value, and the measured value is an m order vector and is an input for filtering.

For single measurement per single measure, a value of I may be 1.

$\hat{x}_k$ and $P_k$ are calculated by using the update equations (3), (4), and (5), and are then substituted into the prediction equations (1) and (2), to obtain a new prediction state value (that is, a priori state estimation value at a moment k+1) and a new prediction covariance value (namely, a priori estimation covariance at the moment k+1).

When the foregoing Kalman filtering tracking algorithm is applied to an actual scenario, a training sample needs to be used in a training stage, so that parameters such as Q, R, A, B, and H in the algorithm are adjusted, to improve a prediction effect. Generally, when these parameters are being calibrated in the training stage, usually, historical data of a target and actual data of the target are used as training samples and are substituted into the foregoing equations, to obtain, through calculation, values of the parameters suitable for the actual scenario. These parameters are usually invariable during the use stage. With reference to the solutions of this application, in the use stage, the foregoing first feedback data may be used as actual data of the target and the first raw data may be used as historical data of the target for calibration of these parameters, to further improve the prediction effect.

In the foregoing technical solution, the first sensor first obtains, from the first raw data by using the first recognition algorithm, the first abstract data including the attribute description data of the first target, then receives, from the processing unit, the first feedback data including the attribute description data of the second target, and optimizes the first recognition algorithm based on the first feedback data. In this manner, the first sensor not only sends, to the processing unit, information recognized by the first sensor from the traffic scenario, namely, the first abstract data, but also can receive the first feedback data from the processing unit. This implements bidirectional transmission. The first sensor may further optimize the first recognition algorithm based on the attribute description data of the second target in the same traffic scenario, so as to improve accuracy of obtaining the first abstract data from the first raw data by using the first recognition algorithm, that is, to improve the recognition accuracy of the first sensor.

It should be noted that the second sensor, similar to a common sensor, may only perform unidirectional data transmission with the processing unit, or may perform the data processing method in this application for bidirectional data transmission with the processing unit, for example, the second sensor 1 shown in FIG. 2. This is not limited in this application.

The first raw data in the foregoing data processing method refers to data obtained from the traffic scenario through measurement at a time point, and both the first abstract data and the first feedback data are data corresponding to the first raw data, that is, data corresponding to the time point. Actually, when the first sensor works, the first sensor usually continuously measures data in different traffic scenarios at a specific frequency. For example, when the first sensor is a camera, the first sensor may capture pictures of traffic scenarios at different frame rates (for example, 30 frames per second or 60 frames per second). For another example, when the first sensor is a LiDAR, the first sensor may scan traffic scenarios based on a specific periodicity (for example, a periodicity of tens of milliseconds). Therefore, at different time points, the first sensor continuously obtains first raw data through measurement. In traffic scenarios corresponding to different first raw data, a traffic participant and a traffic environment may change. For ease of differentiation of first raw data obtained at different time points, optionally, both the first raw data and corresponding first abstract data may include a corresponding timestamp. When another sensor transmits data to the processing unit, second abstract data sent by the another sensor may also include a corresponding timestamp.

The timestamp in embodiments of this application is used to indicate information about a time point of obtaining raw data by the sensor from the scenario through measurement. The timestamp included in the first raw data and the first abstract data is information about a time point of obtaining the first raw data by the first sensor from the scenario through measurement. Correspondingly, a timestamp included in second raw data and second abstract data is used to indicate information about a time point of obtaining the second raw data by the second sensor from the scenario through measurement.

In this way, the processing unit can fuse abstract data with a same timestamp, without mistakenly fusing abstract data with different timestamps. A timestamp included in the first feedback data is the same as the timestamp of the first abstract data and the first raw data that correspond to the first feedback data. In other words, when sending the first feedback data, the processing unit sends the first feedback data corresponding to the timestamp of the first raw data and the first abstract data to the first sensor. Based on this, the first sensor can find the corresponding first abstract data, first raw data, and first feedback data by using the timestamp, to optimize the first recognition algorithm.

Optionally, in step S103, the first sensor carries at least one recognition tag. The recognition tag is used to identify an attribute type of a target that can be recognized by the first sensor. For example, if the first sensor is a LiDAR, the first sensor can recognize a size of a vehicle, a distance between the vehicle and another vehicle, and the like in a traffic scenario, but cannot recognize a color of the vehicle. In this case, the LiDAR can be configured with recognition tags such as a "size", a "distance between the vehicle and another vehicle", and the like. The attribute description data of the second target is obtained based on the fused data or the interaction information, and the attribute description data may include a "size" and the like, and may also include a "color". Because implementation principles for different sensors are different, even if a value of "color" is sent to the LiDAR, the LiDAR cannot use the value of "color" to optimize the first recognition algorithm. Therefore, when the processing unit sends the first feedback data, the first feedback data includes only attribute description data that is of the second target and that matches at least one recognition tag of the first sensor. The foregoing example is still used. When the first sensor is the LiDAR, the first feedback data may include attribute description data such as a "size" of the second target, a "distance between the second target and another vehicle" and the like, and does not need to include attribute description data such as a "color".

Optionally, the first feedback data includes a confidence corresponding to each piece of attribute description data of the second target, and the confidence is used to represent a trustworthiness degree of the piece of attribute description data of the second target.

It should be noted that, for a piece of attribute description data of the second target, a confidence corresponding to the piece of attribute description data of the second target may be included in the piece of attribute description data of the second target, and is represented by using a field in the piece of attribute description data of the second target. Alternatively, the confidence corresponding to the piece of attribute description data of the second target may be included in the first feedback data, and is represented by using an independent character string. This is not limited in this application. When the confidence is represented by using the independent character string, a correspondence is established between the piece of attribute description data of the second target and the corresponding confidence.

In an implementation, a confidence of a piece of attribute description data of the second target may be determined based on a source of the piece of attribute description data. For example, if the attribute description data of the second target comes from the fused data, the confidence of the attribute description data may be set to 80%. If the attribute description data of the second target comes from the cloud server, the confidence may be set to 95%. If the attribute description data of the second target comes from the second target, the confidence may be set to 99%. In other words, the attribute description data of the second target includes a corresponding source tag, and the source tag is used to identify the source of the attribute description data of the second target. Optionally, the source tag may be represented by using a field in the attribute description data of the second target. Because there is a correspondence between a source of the attribute description data of the second target and a confidence of the attribute description data of the second target, the first sensor can determine the corresponding confidence based on the source of the attribute description data of the second target.

In this case, step S103 may include: optimizing the first recognition algorithm based on the attribute description data of the second target and the confidence corresponding to the attribute description data of the second target. In this manner, the first sensor may adjust a calibration amplitude of a parameter of the first recognition algorithm, to further improve recognition accuracy of an optimized first recognition algorithm.

Optionally, for implementation of bidirectional transmission between the first sensor and the processing unit, an embodiment of this application provides a communication interface. The communication interface may be used between the first sensor and the processing unit and between the second sensor and the processing unit.

The communication interface uses a form of "packet header+data body". The packet header includes information such as a protocol version number and the foregoing timestamp. In addition, the packet header may further include a periodicity counter, a location of installing a sensor, a quantity of data bodies, and the like, as shown in Table 5. The periodicity counter is used to indicate a data transmission periodicity, the location of installing the sensor is used to indicate a location of installing the sensor on the vehicle or at the roadside, and the quantity of data bodies is used to indicate a quantity of data bodies included in currently sent data. The data body includes attribute description data of a traffic target, for example, a category, a size, a location, a direction angle, a speed, or an acceleration of the traffic target, as shown in Table 5. It should be noted that specific content in the packet header and the data body may be adjusted based on different application scenarios.

TABLE 5

Example of an implementation form of the communication interface

| | Content |
|---|---|
| Packet header | Protocol version number, timestamp, periodicity counter, location of installing a sensor, quantity of data bodies . . . |
| Data body | Location, direction angle, speed, acceleration, and category of a traffic target, lighting information . . . |

The processing unit can be connected to a plurality of different sensors by using the communication interface, to receive data sent by the sensors and send data to the sensors. In addition, data transmission may also be performed between the processing unit and the cloud sensor by using the communication interface. In this way, a unified interface may be used between each sensor and the processing unit. This simplifies a software design of the processing unit.

A second embodiment of this application provides a data processing method. The method may be executed by a processing unit. The processing unit may be a processing unit having a data fusion function. According to the data processing method, the processing unit can perform bidirectional transmission with the sensor, receive abstract data sent by the sensor, and send feedback data to the sensor, so that the sensor can use the feedback data to optimize a recognition algorithm used by the sensor.

Refer to FIG. 3. The data processing method performed by the processing unit may include the following steps: S201 to S203.

S201: The processing unit receives first abstract data from a first sensor.

The first abstract data comes from first raw data. In an implementation, the first abstract data is obtained by processing the first raw data by the first sensor by using a first recognition algorithm. The first abstract data includes attribute description data of a first target. The first target is a traffic target recognized by the first sensor based on the first raw data from a traffic scenario. The first raw data is data obtained by the first sensor from the traffic scenario through measurement. For the first raw data, the first target, the traffic target, the attribute description data of the first target, the first abstract data, the first recognition algorithm, and the like herein, refer to the foregoing related descriptions. Details are not described herein again.

S202: The processing unit determines first feedback data.

The first feedback data includes attribute description data of a second target, and the second target is a traffic target recognized from the foregoing traffic scenario. For the second target, the attribute description data of the second target, and the like herein, refer to the foregoing related descriptions. Details are not described herein again.

As described above, the processing unit may determine the attribute description data of the second target in a plurality of manners. Optionally, before step S202, the method may further include a step of determining the second target by the processing unit. The second target may include a first specific target and/or a second specific target. The processing unit may determine the first specific target based on the first abstract data or based on interaction information from a cloud sensor. The processing unit may determine the second specific target based on second abstract data or based on the interaction information from the cloud sensor. For details, refer to the foregoing related descriptions. Details are not described herein again.

S203: The processing unit sends the first feedback data to the first sensor.

The processing unit sends the first feedback data to the first sensor, so that the first sensor optimizes the first recognition algorithm by using the first feedback data. For details, refer to the foregoing related descriptions. Details are not described herein again.

Optionally, the data processing method may further include the following step.

S204: The processing unit receives the second abstract data from a second sensor.

For the second abstract data, attribute description data of a third target included in the second abstract data, second raw data, and the like, refer to the related descriptions in the first embodiment. Details are not described herein again.

After receiving abstract data of a plurality of sensors, the processing unit performs data fusion to obtain fused data. One or more second targets may be determined from the fused data. The one or more second targets may include a traffic target recognized by the first sensor, that is, the first specific target, or may include a traffic target not recognized by the first sensor, that is, the second specific target. If the second specific target is included, the second specific target is a traffic target recognized by the second sensor, that is, a target determined by the processing unit based on the second abstract data.

FIG. 4 is a flowchart of an implementation 2 of a data processing method according to this application. Optionally, the data processing method may further include the following step.

S205: The processing unit receives the interaction information from the cloud sensor.

The interaction information obtained by the processing unit from the cloud sensor includes attribute description data that is of a traffic target in the traffic scenario and that is stored on the cloud sensor, for example, attribute description data of a vehicle or a traffic sign in the traffic scenario. Accordingly, the processing unit may determine one or more second targets, where the one or more second targets may include a traffic target recognized by the first sensor, that is, the foregoing first specific target, or may include a traffic target not recognized by the first sensor, that is, the foregoing second specific target.

After determining the second target, the processing unit may determine the attribute description data of the second target based on the fused data or the interaction information. The processing unit sends the first feedback data to the first sensor, where the first feedback data includes the attribute description data of the second target.

It should be noted that, when the second target and the attribute description data of the second target are being determined, the processing unit may interact with the cloud sensor for one or more times. This is not limited in this application. It should be further noted that the processing unit and the cloud sensor may indirectly interact with each other by using a transceiver module or the like in a T-BOX (Telematics BOX). This is not limited in this application. The foregoing data processing method may include both steps S204 and S205, as shown in FIG. 5.

Optionally, for the second specific target in the second targets, the first feedback data further includes location information of the second specific target. For the location information of the second specific target, refer to the related descriptions in the first embodiment. Details are not described herein again.

Optionally, the first feedback data includes a confidence corresponding to each piece of attribute description data of the second target. The confidence is used to represent a trustworthiness degree of the piece of attribute description data of the second target. For the confidence, refer to the related descriptions in the first embodiment. Details are not described herein again.

Optionally, the first abstract data, the first raw data, and the first feedback data further include a timestamp, so that the first sensor determines, by using the timestamp, the first abstract data and the first raw data that correspond to the first feedback data. For details, refer to the related descriptions in the first embodiment. Details are not described herein again.

Figure 6:
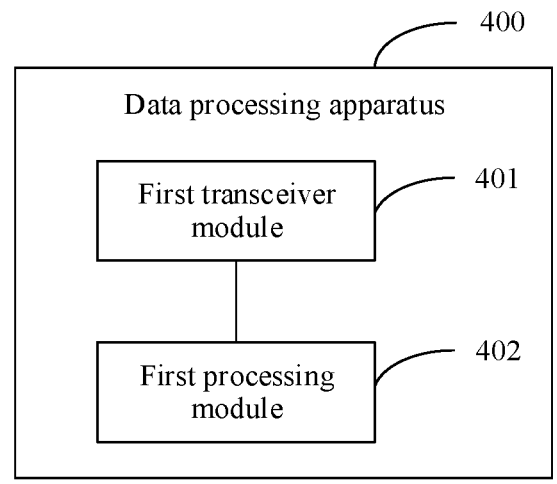
FIG. 6 is a schematic diagram of a structure of a data processing apparatus according to this application.

A third embodiment of this application provides a data processing apparatus. The apparatus may be a sensor, may be an ECU in the sensor, or may be a chip in the sensor. FIG. 6 is a schematic diagram of a structure of an implementation of a data processing apparatus according to an embodiment of this application. The data processing apparatus 400 includes:

a first transceiver module 401, configured to receive first feedback data, where the first feedback data includes attribute description data of a second target; and at least one first processing module 402, configured to obtain first abstract data from first raw data by using a first recognition algorithm, and optimize the first recognition algorithm based on the first feedback data.

The first abstract data includes attribute description data of a first target, the first raw data is measurement data of a scenario, and the first target and the second target are targets in the scenario.

Optionally, the second target includes at least one first specific target, and a target that is the same as the first specific target exists in the first target.

Optionally, the second target includes at least one second specific target, and a target that is the same as the second specific target does not exist in the first target.

Optionally, the first feedback data includes location information and attribute description data of the second specific target. The at least one first processing module 402 is further configured to optimize the first recognition algorithm based on the location information and the attribute description data of the at least one second specific target.

Optionally, the attribute description data of the second target is data determined based on the first abstract data, or data determined based on interaction information from a cloud sensor.

Optionally, the first raw data, the first abstract data, and the first feedback data include a timestamp. The timestamp is used to indicate information about a time point of obtaining the first raw data from the scenario. The at least one first processing module 402 is further configured to: optimize the first recognition algorithm based on the first raw data, the first abstract data, and the first feedback data that correspond to the timestamp.

Optionally, the at least one first processing module 402 is further configured to: optimize the first recognition algorithm based on the attribute description data of the second target and a confidence corresponding to the attribute description data of the second target, where the confidence is used to represent a trustworthiness degree of the attribute description data of the second target.

Optionally, the attribute description data of the second target includes a source tag, and the source tag is used to identify a source of the attribute description data of the second target; and there is a correspondence between the source of the attribute description data of the second target and the confidence of the attribute description data of the second target.

Figure 7:
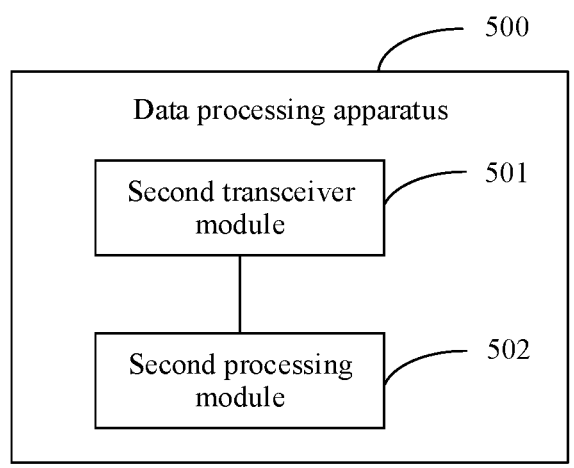
FIG. 7 is a schematic diagram of a structure of another data processing apparatus according to this application.

A third embodiment of this application provides another data processing apparatus. The apparatus is a processing apparatus having a data fusion function. The processing apparatus may be an in-vehicle central processing unit, or may be a chip or a component in the in-vehicle central processing unit. The processing apparatus may alternatively be a fusion unit, or a chip or a component in the fusion unit. The processing apparatus may also be in another product form. The following describes the data processing apparatus in terms of logical functions by using FIG. 7. FIG. 7 is a schematic diagram of a structure of another implementation of a data processing apparatus according to an embodiment of this application. The data processing apparatus 500 includes:

a second transceiver module 501, configured to receive first abstract data from a first sensor, and send first feedback data to the first sensor, where the first abstract data comes from first raw data, the first abstract data includes attribute description data of a first target, the first feedback data includes attribute description data of a second target, the first raw data is measurement data of a scenario, and the first target and the second target are targets recognized from the scenario; and at least one second processing module 502, configured to determine the first feedback data.

Optionally, the at least one second processing module 502 is further configured to determine at least one first specific target based on the first abstract data or based on interaction information from a cloud sensor, where a target that is the same as the first specific target exists in the first target. In this case, the first feedback data includes attribute description data of the at least one first specific target.

Optionally, at least one second specific target is determined based on second abstract data or based on the interaction information from the cloud sensor, where the second abstract data comes from second raw data, the second raw data is measurement data of the scenario, the second abstract data includes attribute description data of a third target, the third target is a target in the scenario, a target that is the same as the second specific target does not exist in the first target. In this case, the first feedback data includes attribute description data of the at least one second specific target.

Optionally, the first feedback data further includes location information of the at least one second specific target.

Optionally, the at least one second processing module 502 is further configured to: determine the attribute description data of the second target based on the first abstract data or based on the interaction information from the cloud sensor.

Optionally, the first raw data, the first abstract data, and the first feedback data include a timestamp; and the timestamp is used to indicate information about a time point of obtaining the first raw data from the scenario through measurement; and the at least one second processing module 502 is further configured to send the first feedback data corresponding to the timestamp of the first raw data and the first abstract data to the first sensor.

Optionally, the first feedback data includes a confidence corresponding to each piece of attribute description data of the second target, and the confidence is used to represent a trustworthiness degree of the piece of attribute description data of the second target.

Optionally, each piece of attribute description data of the second target includes a corresponding source tag, and the source tag is used to identify a source of the piece of attribute description data of the second target; and there is a correspondence between the source of the piece of attribute description data of the second target and the confidence of the piece of attribute description data of the second target.

It may be understood that division of the foregoing modules is merely division of logical functions. During actual implementation, functions of the first transceiver module or the second transceiver module may be implemented by a transceiver, and functions of the first processing module or the second processing module may be implemented by a processor. When the apparatus is the sensor, the transceiver may include a receiving antenna and a transmitting antenna to perform receiving and transmitting functions, respectively.

During actual application, both the first transceiver module 401 and the second transceiver module 501 may be implemented using data interfaces or in another possible form. This is not limited in this application.

The first processing module 402 and the second processing module 502 may be a general-purpose processor, a digital signal processor, an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The general-purpose processor may be a microprocessor, any conventional processor, or the like.

Figure 8:
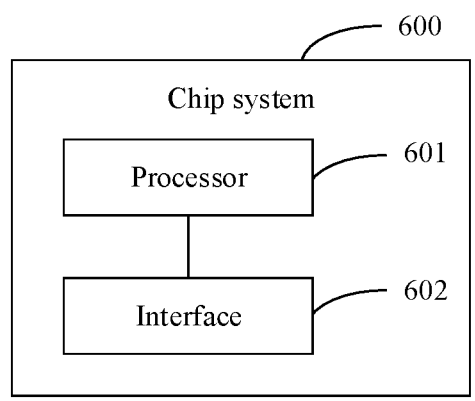
FIG. 8 is a schematic diagram of a structure of an implementation 1 of a chip system according to this application.

A third embodiment of this application further provides a chip system. FIG. 8 is a schematic diagram of a structure of an implementation of a chip system according to an embodiment of this application. The chip system 600 includes at least one processor 601 and an interface 602. The interface 602 is configured to receive code instructions and transmit the code instructions to the at least one processor 601, and the at least one processor 601 runs the code instructions to implement any method performed by the foregoing sensor or processing unit.

The processor 601 may be a general-purpose processor, a digital signal processor, an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The general-purpose processor may be a microprocessor, any conventional processor, or the like.

It should be understood that the chip system 600 may include one chip, or may include a chip module including a plurality of chips. This is not limited in this application.

This embodiment further provides a vehicle. The vehicle may include any one of the foregoing data processing apparatus 400. In addition, the vehicle may further include any one of the foregoing data processing apparatus 500. A specific implementation form of the vehicle is not limited in this application.

This embodiment further provides a terminal. The terminal may be disposed in a traffic scenario, for example, installed on the roadside. The terminal may include any one of the foregoing data processing apparatus 400, and the terminal may further include any one of the foregoing data processing apparatus 500. A specific implementation form of the terminal is not limited in this application.

This embodiment further provides a system. The system may include any one of the foregoing data processing apparatus 400. In addition, the system may further include any one of the foregoing data processing apparatus 500.

An embodiment further provides a computer-readable medium. The computer-readable storage medium is configured to store a computer program or instructions. When the computer program or instructions runs or are run on an electronic device, the electronic device implements some or all of the steps of any method performed by the foregoing sensor or processing unit.

The readable storage medium herein may be a magnetic disk, an optical disc, a DVD, a USB, a read-only memory (ROM), a random access memory (RAM), or the like. A specific storage medium form is not limited in this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, by using a coaxial cable, an optical fiber, or a digital subscriber line (DSL)) or wireless (for example, infrared, radio, microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

It should be understood that, in various embodiments of this application, an execution sequence of each step should be determined based on a function and internal logic of the step. A sequence number of each step does not mean an execution sequence, and does not constitute a limitation on an implementation process of the embodiments.

Unless otherwise stated, "a plurality of" in this specification means two or more. In the embodiments of this application, words such as "first" and "second" are used to distinguish between same items or similar items having basically same functions and effects. A person skilled in the art may understand that words such as "first" and "second"

do not constitute a limitation on a quantity or an execution sequence, and words such as "first" and "second" do not indicate a necessary difference either.

It should be understood that, in the schematic diagrams of the architectures of embodiments of this application, a connection between functional modules is merely an example, and does not represent a physical cabling or a network connection manner in an actual application.

It should be understood that same and similar parts between the embodiments in this specification may be mutually referred to. Particularly, the embodiments of the data processing apparatus, the chip system, the vehicle, the terminal, and the computer-readable storage medium are basically similar to the method embodiments, and therefore are briefly described. For related parts, refer to descriptions in the method embodiments. The foregoing implementations of the present disclosure do not constitute a limitation on the protection scope of the present disclosure.

What is claimed is:

1. A data processing method, comprising:
obtaining, by a first sensor, first abstract data from first raw data using a first recognition algorithm, wherein the first raw data is captured by the first sensor and the first abstract data comprises attribute description data of a first target;
receiving, by the first sensor, first feedback data, wherein the first feedback data comprises attribute description data of a second target, wherein the first feedback data is based on second raw data captured by one or more second sensors other than the first sensor; and
optimizing, by the first sensor, the first recognition algorithm based on the first feedback data, wherein the first raw data is measurement data of a scenario, and the first target and the second target are targets in the scenario, wherein the second target comprises at least one second specific target, and a target that is the same as the second specific target does not exist in the first target.

2. The method according to claim 1, wherein the second target comprises at least one first specific target, and a target that is the same as the first specific target exists in the first target.

3. The method according to claim 1, wherein the first feedback data comprises location information and attribute description data of the at least one second specific target; and
wherein optimizing the first recognition algorithm based on the first feedback data comprises:
optimizing the first recognition algorithm based on the location information and the attribute description data of the at least one second specific target.

4. The method according to claim 1, wherein the attribute description data of the second target is data determined based on the first abstract data, or data determined based on interaction information from a cloud sensor.

5. The method according to claim 1, wherein the first raw data, the first abstract data, and the first feedback data comprise a timestamp, wherein the timestamp indicates information about a time point of obtaining the first raw data from the scenario; and
wherein optimizing the first recognition algorithm based on the first feedback data comprises:
optimizing the first recognition algorithm based on the first raw data, the first abstract data, and the first feedback data that correspond to the timestamp.

6. The method according to claim 1, wherein optimizing the first recognition algorithm based on the first feedback data comprises:
optimizing the first recognition algorithm based on the attribute description data of the second target and a confidence corresponding to the attribute description data of the second target, wherein the confidence represents a trustworthiness degree of the attribute description data of the second target.

7. The method according to claim 6, wherein the attribute description data of the second target comprises a source tag of a source of the attribute description data, and the source tag identifies a source of the attribute description data of the second target, wherein there is a correspondence between the source of the attribute description data of the second target and the confidence of the attribute description data of the second target.

8. A data processing method, comprising:
receiving first abstract data from a first sensor, wherein the first abstract data is based on first raw data captured by the first sensor, and the first abstract data comprises attribute description data of a first target;
determining first feedback data, wherein the first feedback data comprises attribute description data of a second target, wherein the first feedback data is based on second raw data captured by one or more second sensors other than the first sensor;
sending the first feedback data to the first sensor, wherein the first raw data is measurement data of a scenario, and the first target and the second target are targets in the scenario; and
determining at least one second specific target based on second abstract data or based on interaction information from a cloud sensor, wherein the second abstract data is based on second raw data, the second raw data is measurement data of the scenario, the second abstract data comprises attribute description data of a third target, the third target is a target in the scenario, and a target that is the same as the at least one second specific target does not exist in the first target, wherein the first feedback data comprises attribute description data of the at least one second specific target.

9. The method according to claim 8, further comprising:
determining at least one first specific target based on the first abstract data or based on interaction information from a cloud sensor, wherein a target that is the same as the first specific target exists in the first target, wherein the first feedback data comprises attribute description data of the at least one first specific target.

10. The method according to claim 8, wherein the first feedback data further comprises location information of the at least one second specific target.

11. The method according to claim 8, wherein determining the first feedback data comprises:
determining the attribute description data of the second target based on the first abstract data or based on the interaction information from a cloud sensor.

12. The method according to claim 8, wherein the first raw data, the first abstract data, and the first feedback data comprise a timestamp, wherein the timestamp indicates information about a time point of obtaining the first raw data from the scenario through measurement; and
wherein sending the first feedback data to the first sensor comprises:
sending the first feedback data corresponding to the timestamp of the first raw data and the first abstract data to the first sensor.

13. The method according to claim 8, wherein the first feedback data comprises a confidence corresponding to each piece of attribute description data of the second target, and the confidence represents a trustworthiness degree of the piece of attribute description data of the second target.

14. The method according to claim 13, wherein each piece of attribute description data of the second target comprises a corresponding source tag, and the source tag identifies a source of the piece of attribute description data of the second target, wherein there is a correspondence between the source of the piece of attribute description data of the second target and the confidence of the piece of attribute description data of the second target.

15. A data processing apparatus, comprising:
- a first transceiver, configured to receive first feedback data, wherein the first feedback data comprises attribute description data of a second target, wherein the first feedback data is based on second raw data captured by one or more second sensors other than a first sensor; and
- at least one first processor, configured to:
  - obtain first abstract data from first raw data using a first recognition algorithm, wherein the first raw data is captured by the first sensor; and
  - optimize the first recognition algorithm based on the first feedback data, wherein the first abstract data comprises attribute description data of a first target, the first raw data is measurement data of a scenario, and the first target and the second target are targets in the scenario;
- wherein the second target comprises at least one second specific target, and a target that is the same as the second specific target does not exist in the first target.

* * * * *